United States Patent
Sakamoto

(10) Patent No.: US 8,681,221 B2
(45) Date of Patent: Mar. 25, 2014

(54) VEHICULAR IMAGE PROCESSING DEVICE AND VEHICULAR IMAGE PROCESSING PROGRAM

(75) Inventor: Yosuke Sakamoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 396 days.

(21) Appl. No.: 12/922,475

(22) PCT Filed: Mar. 24, 2009

(86) PCT No.: PCT/JP2009/001294
§ 371 (c)(1),
(2), (4) Date: Sep. 14, 2010

(87) PCT Pub. No.: WO2009/119070
PCT Pub. Date: Oct. 1, 2009

(65) Prior Publication Data
US 2011/0019000 A1      Jan. 27, 2011

(30) Foreign Application Priority Data

Mar. 26, 2008 (JP) ................................. 2008-080728
Mar. 26, 2008 (JP) ................................. 2008-081332

(51) Int. Cl.
*G06T 5/00* (2006.01)
*G06T 7/60* (2006.01)
*G06K 9/00* (2006.01)

(52) U.S. Cl.
CPC ... *G06T 5/00* (2013.01); *G06T 7/60* (2013.01); *G06K 9/00* (2013.01)
USPC .......................................... 348/148; 382/100

(58) Field of Classification Search
CPC .................. G06K 9/00798; G06T 2207/10016; G06T 2207/30256
See application file for complete search history.

(56) References Cited

U.S. PATENT DOCUMENTS 6,819,779 B1 * 11/2004 Nichani ......................... 382/104
6,850,629 B2 *  2/2005 Jeon ............................... 382/104

(Continued)

FOREIGN PATENT DOCUMENTS

JP        6-258046 A     9/1994
JP       07-200997 A     8/1995

(Continued)

OTHER PUBLICATIONS

Wu et al, "Image Processing Techniques for Lane-Related Information Extraction and Multi-Vehicle Detection in Intelligent Highway Vehicles", Int. J. Automotive Technology, vol. 8, No. 4, 2007, pp. 513-520.*

(Continued)

*Primary Examiner* — Jay Au Patel
*Assistant Examiner* — Reza Aghevli
(74) *Attorney, Agent, or Firm* — Carrier Blackman & Associates, P.C.; Joseph P. Carrier; William D. Blackman

(57) ABSTRACT

A vehicular image processing device is provided with a kernel setting unit which sets a plurality of smoothing kernels which have a width supposed to be between the width of the lane mark and that of the road to the image acquired from a photographing unit, a smoothing unit which smoothes the acquired image by filtering using the set smoothing kernels, a variation degree calculating unit which calculates the variation degree of the pixel value of each pixel in the acquired image with respect to the smoothed image, and a pixel value replacing unit which replaces the pixel value of a pixel which is of the acquired image and has the variation degree not greater than a predefined value with a specific value.

18 Claims, 12 Drawing Sheets

(56) References Cited

U.S. PATENT DOCUMENTS

| | | | |
|---|---|---|---|
| 7,038,577 B2 * | 5/2006 | Pawlicki et al. | 340/435 |
| 8,135,175 B2 * | 3/2012 | Aoki et al. | 382/104 |
| 2009/0041303 A1 | 2/2009 | Aoki et al. | |
| 2009/0208058 A1 * | 8/2009 | Schofield et al. | 382/103 |

FOREIGN PATENT DOCUMENTS

| | | |
|---|---|---|
| JP | 2000-182181 | 6/2000 |
| JP | 2002-230530 A | 8/2002 |
| JP | 2003-271930 | 9/2003 |
| JP | 2006-331193 A | 12/2006 |

OTHER PUBLICATIONS

Chang et al, "A Vision-Based Vehicle Behavior Monitoring and Warning System", IEEE 6th Int. Conf. Intelligent Transportation Systems, Shangahi, China, 2003, pp. 1-6.*

U.S. Department of Transportation, National Highway Traffic Safety Administration, "Integrated Vehicle-Based Safety System", Oct. 2007, pp. 1-128.*

Papananos Y et al.: "Analysis and VLSI Architecture of a Nonlinear Edge-Preserving Noise-Smoothing Image Filter", IEEE Proceedings G. Electronic Circuits & Systems, Institution of Electrical Engineers. Stevenage, GB, vol. 138, No. 4, Aug. 1, 1991, pp. 433-440.

Du Buf J M H et al.: "A quantitative comparison of edge-preserving smoothing techniques", Signal Processing, Elsevier Science Publishers B.V. Amsterdam, NL, vol. 21, No. 4, Dec. 1, 1990, pp. 289-301.

* cited by examiner $\delta x, \delta y$ : 1 PHYSICAL INTERVAL PER PIXEL

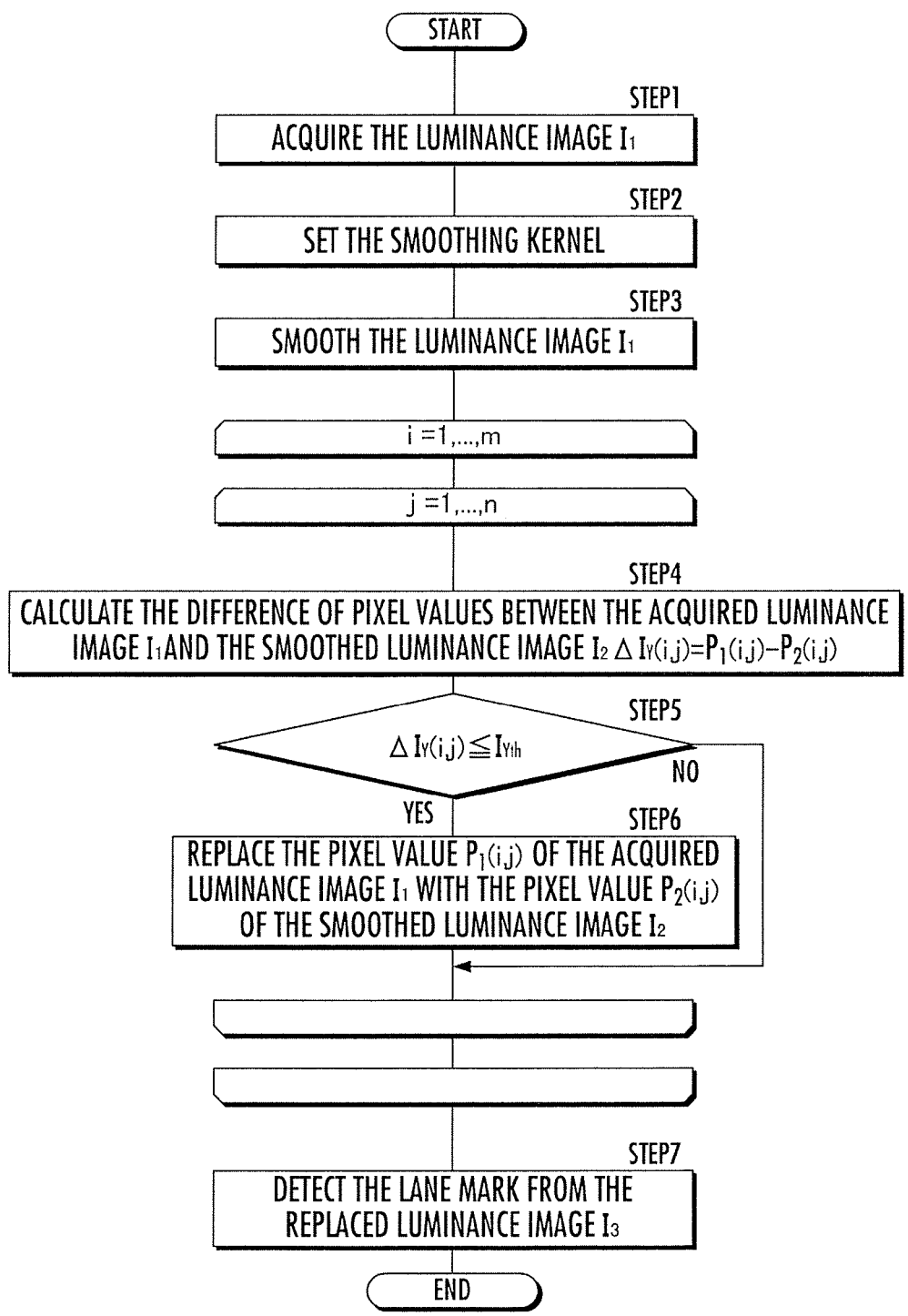

VEHICULAR IMAGE PROCESSING DEVICE AND VEHICULAR IMAGE PROCESSING PROGRAM

PRIORITY CLAIM

The present application is the US National Phase of International Application PCT/JP2009/001294, filed Mar. 24, 2009, which is based on and claims the priority benefit of Japanese Patent Applications 2008-081332 and 2008-080728, each filed on Mar. 26, 2008, the contents of which are incorporated herein by reference in its entirety.

BACKGROUND OF THE INVENTION

1. Field of the Invention

The present invention relates to a vehicular image processing device for processing an image of the circumference of a vehicle acquired by a photographing unit, and a vehicular image processing program causing a computer to perform the mentioned process.

2. Description of the Related Art

Conventionally, there has been known an art configured to process an image of the circumference of a vehicle acquired by a photographing unit and recognize a lane mark such as a white line or the like on a road where the vehicle is travelling, or a subject such as a pedestrian, another vehicle or the like present in the circumference of the vehicle (for example, refer to Japanese Patent Laid-open No. H7-200997). According to the art, information can be provided to a driver or the travel of the vehicle can be controlled according to the recognition result of the lane mark or the subject.

In each processing cycle, the vehicular circumference recognizing device of the conventional art receives an image of the front side of the vehicle photographed by a camera mounted in the vehicle, sets a window for the processing subject in the image, sets the color of a lower portion of the window as the reference color for a road surface area (an area except the white line inside the road), sets an area with color similar to (color similarity is greater than a predefined value) the reference color as the road surface area, and differentiates the road surface area from the non-road surface area (the white line or the non-road area). Thereafter, the device performs detection of the white line, namely detects a straight line obtained respectively from the left and right boundaries of the differentiated road surface area as an edge portion of the white line. Herein, the window is set to a single one in the image according to the positions of the two white lines detected in the previous processing cycle, or according to a fixed value set on the basis of a predefined road information such as the width of a road or the width of a travel lane.

However, after a road is repaired, sometimes a repaired position or a local shadow may be left on the road surface. Most possibly, the repaired position has color locally different from the ambient road surface. Further, the local shadow portion, due to the color further added according to the scattering light only, may have color deviated from the ambient road surface.

Therefore, according to the vehicular circumference recognizing device of the mentioned conventional art, the local repaired position or the local shadow portion in the window may be differentiated as the non-road surface area due to the deviation of color from the reference color. Since the white line is detected according to the boundary therebetween, the white line may be detected with error. In the case of using luminance instead of color, the same result will be obtained.

Moreover, the color of a road surface may vary in the road surface area, for example, when time passes or the color thereof is not identically defined by government. Thus, it is supposed that a wide partial area with color different from the ambient area is present in the road surface area. When the partial area is present, it is difficult for the device in the conventional art mentioned above to use the color of the lower portion in the window as the reference color of the road surface to differentiate the road surface area from the non-road surface area.

In other words, when the color in the road surface area is not identical, it is difficult to set the reference color and the conditions for defining a color similar to the reference color appropriately. If the setting is loose, the lane mark will be included in the road surface area; on the other hand, if the setting is strict, the portion area will be differentiated as the non-road surface area. Thereby, the boundary between the road surface area and the non-road surface area will be obtained with error. Since the white line or a proceeding vehicle is detected according to the boundary obtained with error, the white line or the proceeding vehicle may be detected with error. In the case of using luminance instead of color, the same result will be obtained.

SUMMARY OF THE INVENTION

The present invention has been accomplished in view of the aforementioned problems, and it is therefore an object of the present invention to provide a vehicular image processing device capable of processing a photographed image of the circumference of a vehicle to reduce influences from variation of luminance and color of a road surface so as to detect a lane mark on a road where the vehicle is travelling precisely from the processed image.

The vehicular image processing device of the present invention is configured to process an image acquired from a photographing unit mounted in a vehicle and detect a lane mark on a road where the vehicle is travelling from the processed image. The vehicular image processing device of the present invention comprises: a kernel setting unit configured to set a kernel size for the image acquired from the photographing device so that the width of the kernel in a predefined direction is in a predefined range greater than the width of an image portion of the lane mark in the predefined direction; a smoothing unit configured to smooth the acquired image according to a filtering process by the usage of the smoothing kernel size set by the kernel setting unit; a variation degree calculating unit configured to calculate a variation degree of the pixel value of each pixel in the acquired image with respect to the smoothed image processed by the smoothing unit; a pixel value replacing unit configured to replace the pixel value of the acquired image with a specific value if the variation degree is equal to or smaller than a predefined value; and a lane mark detecting unit configured to detect the lane mark from the image with the pixel value replaced by the pixel value replacing unit.

According to the vehicular image processing device of the first aspect of the present invention, the kernel size is set by the kernel setting unit and the acquired image is smoothed by the smoothing unit according to a filtering process by the usage of a smoothing kernel with the set size. In the smoothing by the smoothing unit for each pixel in the image, a smoothing kernel is disposed with a pixel as the central pixel, and a process is performed to set the average pixel value of all pixels contained in the range of smoothing kernel equal to the pixel value of the central pixel. According thereto, the variation width of the pixels in the image becomes narrower, and a low-contrast image can be obtained.

The image of the road is smoothed by using the kernel size set by the kernel setting unit in such a way that the width in a predefined direction is in a predefined range greater than the width of an image portion of the lane mark in the predefined direction. Thereby, when the kernel is disposed with a pixel of the image portion such as a lane mark, a local repaired position or a local shadow portion as the central pixel, more image portion of the ambient road surface will be included into the range of smoothing kernel. Consequently, in the smoothed image, the pixel value of the pixels constituting the image portion of the local repaired position or shadow portion or constituting the image portion of the lane mark on the road surface becomes approximate to the pixel value of the pixels constituting the image portion of the ambient road surface.

In the image portion of the road surface, also including the case when a wide partial area of a pixel value different from the ambient area is present in the road surface area, it is supposed that the size of the image portion of the road surface and the partial area is greater than that of the image portion of the lane mark. Thus, when the kernel is disposed with the pixels of the image portion of the road surface and the partial area as the central pixels, more image portion of the road surface and the partial area will be included into the range of smoothing kernel. Consequently, the image portion of the road surface and the partial area will be less affected by smoothing; thereby, the pixel value of the smoothed image maintains remains the same as the pixel value of the image before smoothing.

Therefore, when the variation degree of the pixel value for each pixel in the acquired image with respect to the smoothed image processed by the smoothing unit is calculated by the variation degree calculating unit, for the image portion of the lane mark with a greater pixel value than the image portion of the road surface, the variation degree is a great positive value; for the image portion of the local repaired position or shadow with a smaller pixel value than the image portion of the road surface, the variation degree is a small value (including negative values). On the other hand, for the image portion of the road surface including the wide partial area with a pixel value different from the ambient area, the variation on the pixel values before smoothing and after smoothing is small; thus, the variation degree therebetween is a small value (including negative values).

Thereby, the pixel value of the pixel with the variation degree equal to or smaller than the predefined value in the acquired image is replaced with the specific value by the pixel value replacing unit. Herein, the specific value is a fixed value preliminarily defined (for example, the pixel value of the image portion of the lane mark is given to a value sufficiently smaller than it should have, for example zero), or is a pixel value of a pixel corresponded to the pixel in the smoothed image with the variation degree equal to or smaller than the predefined value.

Accordingly, the pixel value of the pixels in the image portion of the road surface including the partial area with a pixel value different from the ambient area or the pixel value of the pixels in the image portion of the local repaired position or shadow is replaced with the specific value, and the pixel value of the pixels in the image portion of the lane mark is maintained. Thus, in the image with the pixel value replaced by the pixel value replacing unit, the image portion of the lane mark is maintained, and the lane mark is detected by the lane mark detecting unit on the basis of the replaced image. Consequently, the lane mark can be detected precisely.

In the vehicular image processing device of the present invention, it is preferred that the kernel setting unit sets the kernel size in such a way that the kernel size for an image portion in the image corresponded to a predefined area on the road is set smaller as a distance from the vehicle to the predefined area on the road is becoming greater.

According to the preferred embodiment, the greater the distance from the vehicle to the predefined area on the road is in the real space, the smaller the size of the image portion of the predefined area is in the image. Thus, the kernel size is set in such a way that the kernel size for an image portion in the image corresponded to a predefined area on the road is set smaller as a distance from the vehicle to the predefined area on the road is becoming greater. Thereby, for each position in the image, when the kernel is disposed with the pixels of the image portion of the lane mark or the image portion of the local repaired position or shadow as the central pixels, more image portion of the ambient road surface can be included in the kernel range.

In the vehicular image processing device of the present invention, it is preferred that the kernel setting unit sets the kernel to a rectangular shape or a trapezoidal shape.

According to the preferred embodiment, the lane mark such as the white line or yellow line on the road where the vehicle is travelling is of a linear shape. Thus, by setting the smoothing kernel to a rectangular shape or a trapezoidal shape, it is possible to dispose the smoothing kernel to match the shape of the image portion of the lane mark.

Moreover, it is preferred that the kernel setting unit sets the direction of the kernel in such a way that the inclination of the center line of the long side of the rectangular shape or the trapezoidal shape of the kernel with respect to the direction corresponded to the travelling direction of the vehicle in the image is equal to a predefined angle.

According to the preferred embodiment, it is supposed that the lane mark on a road where the vehicle is travelling is photographed toward a disappearing point along the direction corresponded to the travelling direction of the vehicle in the image. Thus, by setting the direction of the kernel in such a way that the inclination of the center line of the long side of the kernel with respect to the direction corresponded to the travelling direction of the vehicle in the image is equal to a predefined angle, it is possible to set the smoothing kernel in accordance with the direction of the image portion of the lane mark.

In the vehicular image processing device of the present invention, it is preferred that the variation degree calculating unit calculates a difference of pixel value of each pixel obtained by subtracting the pixel value of each pixel in the smoothed image from the pixel value of each pixel in the acquired image or a ratio of pixel value of each pixel obtained by dividing the pixel value of each pixel in the acquired image by the pixel value of each pixel in the smoothed image as the variation degree.

According to the preferred embodiment, the difference of pixel value of each pixel obtained by subtracting the pixel value of each pixel in the smoothed image from the pixel value of each pixel in the acquired image or the ratio of pixel value of each pixel obtained by dividing the pixel value of each pixel in the acquired image by the pixel value of each pixel in the smoothed image is a value indicating the variation degree, thereby, by using the difference or the ratio, it is possible to replace appropriately the pixel value of the image by the pixel value replacing unit.

In the vehicular image processing device of the present invention, it is preferred that luminance is used as the pixel value in the smoothed image processed by the smoothing unit.

According to the preferred embodiment, it is supposed that the image portion of the lane mark with a bright white or yellow color, the image portion of the road surface with a dark gray or brown color, and the image portion of the local repaired position or shadow with even darker color have different luminance. When the luminance or the saturation is used as the pixel value in the image, by replacing the pixel value so as to remove the image portion of the local repaired position or shadow while maintaining the image portion of the lane mark, the image portion of the lane mark can be detected from the replaced image precisely.

It is also preferred that luminance or saturation calculated from color components of a color image is used as the pixel value in the smoothed image processed by the smoothing unit.

According to the preferred embodiment, it is supposed that the image portion of the lane mark with a bright white or yellow color, the image portion of the road surface with a dark gray or brown color, and the image portion of the local repaired position or shadow with even darker color have different luminance. When the luminance or the saturation is used as the pixel value in the image, by replacing the pixel value so as to remove the image portion of the local repaired position or shadow while remain the image portion of the lane mark, the image portion of the lane mark can be detected from the replaced image precisely.

In the vehicular image processing device of the present invention, it is preferred that the lane mark detecting unit detects an area composed of pixels of pixel value not equal to the fixed value in the replaced image by the pixel value replacing unit as an image portion corresponded to the lane mark on the road where the vehicle is travelling.

According to the preferred embodiment, the pixel value of the image portion except the lane mark is replaced with the fixed value in the replaced image, thus, the area composed of pixels with the pixel value not equal to the fixed value in the replaced image can be detected as the image portion of the lane mark by the lane mark detecting unit. Thereby, the lane mark on a road where the vehicle is travelling can be easily detected by the lane mark detecting unit even without performing an edge extraction process or the like.

The present invention provides a vehicle which is provided with a photographing unit and has a function of processing an image acquired from the photographing unit and detecting a lane mark on a road where the vehicle is travelling.

The vehicle of the present invention is further provided with a kernel setting unit configured to set a kernel size for the image acquired from the photographing device so that the width of the kernel in a predefined direction is in a predefined range greater than the width of an image portion of the lane mark in the predefined direction; a smoothing unit configured to smooth the acquired image according to a filtering process by the usage of the smoothing kernel size set by the kernel setting unit; a variation degree calculating unit configured to calculate a variation degree of the pixel value of each pixel in the acquired image with respect to the smoothed image processed by the smoothing unit; a pixel value replacing unit configured to replace the pixel value of the acquired image with a specific value if the variation degree is equal to or smaller than a predefined value; and a lane mark detecting unit configured to detect the lane mark from the image with the pixel value replaced by the pixel value replacing unit.

Herein, the specific value is a fixed value preliminarily defined (for example, the pixel value of the image portion of the lane mark is given to a value sufficiently smaller than it should have, for example zero), or a pixel value of a pixel corresponded to the pixel in the smoothed image with the variation degree equal to or smaller than the predefined value.

As described in the vehicular image processing device of the present invention, according to the vehicle of the present invention, the kernel size is set by the kernel setting unit in such a way that the width in a predefined direction is in a predefined range greater than the width of the image portion of the lane mark in the predefined direction, and the acquired image is smoothed by the smoothing unit according to a filtering process by the usage of the smoothing kernel with the set size. Consequently, in the smoothed image, the pixel value of the pixels constituting the image portion of the local repaired position or shadow portion or constituting the image portion of the lane mark on the road surface becomes approximate to the pixel value of the pixels constituting the image portion of the ambient road surface. Additionally, the pixel values for the image portion of the road surface and the wide partial area with a pixel value different from the ambient area in the image portion of the road surface are retained in the smoothed image the same as that in the image before smoothed.

Thereby, for the image with the pixel value replaced by the pixel value replacing unit, the pixel value of the pixels in the image portion of the road surface including the partial area with a pixel value different from the ambient area or the pixel value of the pixels in the image portion of the local repaired position or shadow is replaced with the specific value, and the pixel value of the pixels in the image portion of the lane mark is maintained and the lane mark is detected by the lane mark detecting unit on the basis of the replaced image. The lane mark can be detected precisely.

The present invention further provides a vehicular image processing program configured to cause a computer to process an image acquired from a photographing unit mounted in a vehicle and detect a lane mark on a road where the vehicle is travelling from the processed image.

The computer is caused to execute: a kernel setting process configured to set a kernel size for the image acquired from the photographing device so that the width of the kernel in a predefined direction is in a predefined range greater than the width of an image portion of the lane mark in the predefined direction; a smoothing process configured to smooth the acquired image according to a filtering process by the usage of the smoothing kernel size set by the kernel setting process; a variation degree calculating process configured to calculate a variation degree of the pixel value of each pixel between the acquired image and the image smoothed by the smoothing process; a pixel value replacing process configured to replace the pixel value of the acquired image with a specific value if the variation degree is equal to or smaller than a predefined value; and a lane mark detecting process configured to detect the lane mark from the image with the pixel value replaced by the pixel value replacing process.

Herein, the specific value is a fixed value preliminarily defined (for example, the pixel value of the image portion of the lane mark is given to a value sufficiently smaller than it should have, for example zero), or a pixel value of a pixel corresponded to the pixel in the smoothed image with the variation degree equal to or smaller than the predefined value.

According to the vehicular image processing program of the present invention, the process exhibiting the effects described in the vehicular image processing device of the present invention can be made to be executed in the computer.

BRIEF DESCRIPTION OF THE DRAWINGS

FIG. 9 is a flow chart illustrating an image process performed by the vehicular image processing device according to a second embodiment of the present invention.

DETAILED DESCRIPTION OF THE PREFERRED EMBODIMENTS

First Embodiment

Hereinafter, a first embodiment of the present invention will be described in detail with reference to FIG. 1 to FIG. 7.

Figure 1:
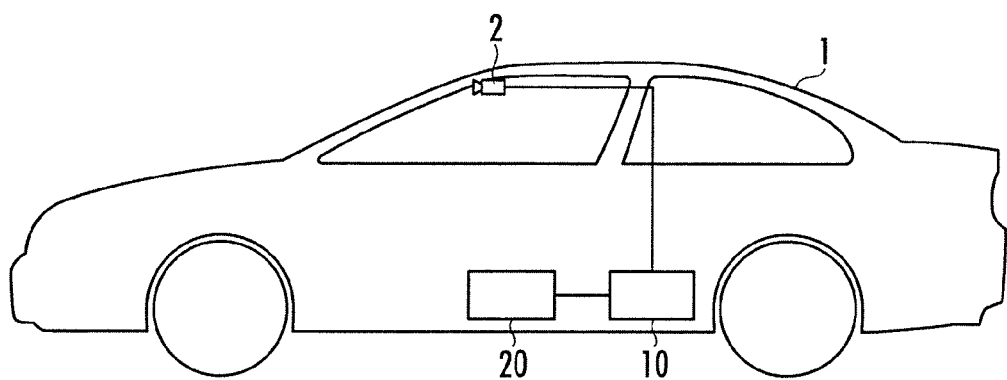
FIG. 1 is an explanatory diagram illustrating a vehicle mounted with a vehicular image processing device of the present invention.

As illustrated in FIG. 1, a vehicular image processing device 10 of the present embodiment is mounted in a vehicle 1 for use. The vehicle 1 mounted with the vehicular image processing device 10 is equivalent to the vehicle of the present invention. The vehicular image processing device 10 detects a lane mark on a road where the vehicle 1 is travelling according to an image photographed by a camera 2 for photographing the front side of the vehicle 1. The camera 2 which is equivalent to the photographing unit of the present invention is composed of a CCD camera or other photographing elements and is disposed at a front portion of the vehicle 1.

Position data of a lane mark detected by the vehicular image processing device 10 is output to an ECU (Electronic Control Unit) 20 disposed in the vehicle 1. The ECU 20 recognizes traffic lines of the road where the vehicle 1 is travelling according to the position data of the lane mark, and performs a traffic line deviation determining process configured to determine a possibility of deviation of the vehicle 1 from the traffic line, an attention-attracting output process configured to generate an attention-attracting output (for example, vocal output or the like from a speaker (not shown)) when it is possible that the vehicle 1 may deviate from the traffic line, and a traffic line-deviation preventing control process configured to assist the operation of a brake or a steering wheel of the vehicle 1 so as to prevent the vehicle 1 from deviating from the traffic line.

Figure 2:
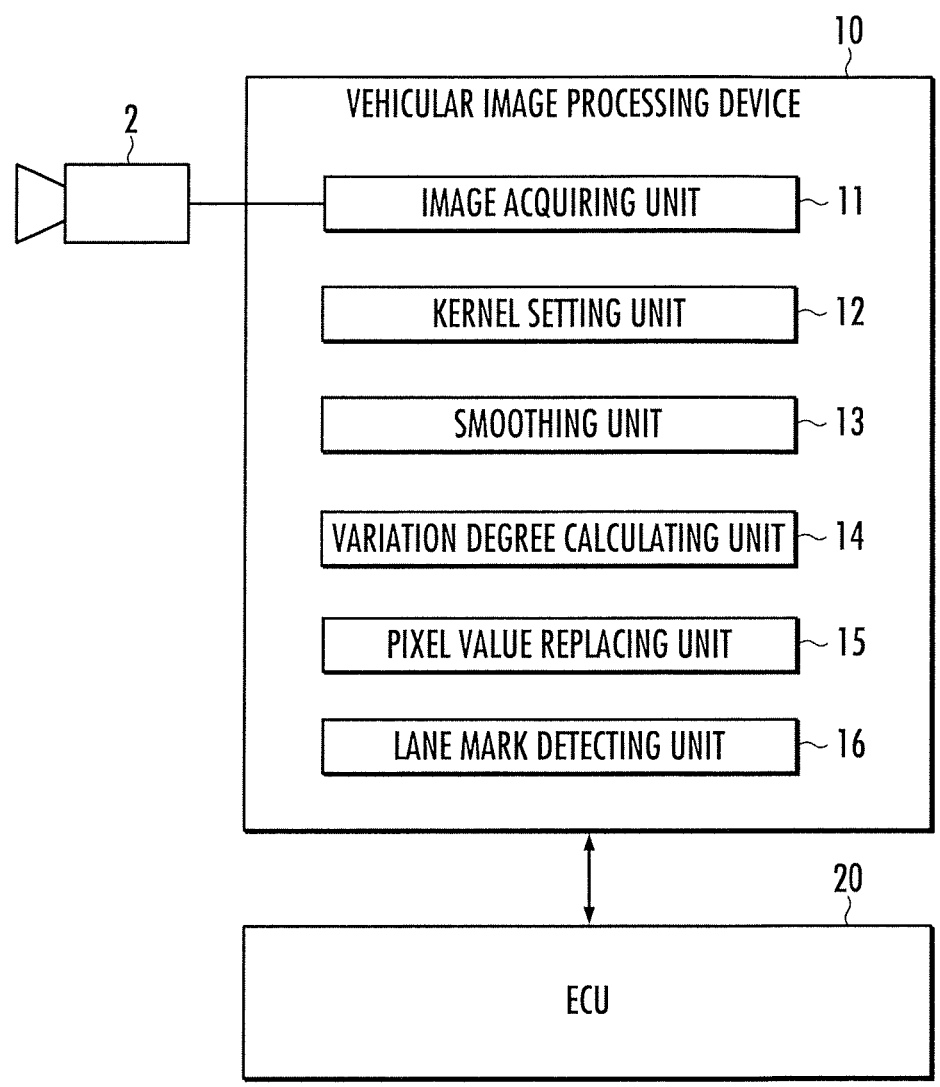
FIG. 2 is a diagram illustrating a configuration of the vehicular image processing device of the present invention.

Referring to FIG. 2, the vehicular image processing device 10 is provided with an image acquiring unit 11, a kernel setting unit 12, a smoothing unit 13, a variation degree calculating unit 14, a pixel value replacing unit 15, and a lane mark detecting unit 16 so as to carry out its functions.

Image signals output from the camera 2 are input to the image acquiring unit 11 and the image acquiring unit 11 acquires a color image composed of pixel data from the input image signals. The pixel data is constituted by color components of R value, G value and B value. Further, the image acquiring unit 11 calculates luminance Y of a pixel according to the color components (R, G, B) of the pixel in the acquired color image and acquires a luminance image with the luminance Y as a pixel value. Furthermore, the image acquiring unit 11 calculates saturation S of the pixel from the color components (R, G, B) of the pixel in the acquired color image and acquires a saturation image with the saturation S as the pixel value.

The kernel setting unit 12 sets a kernel size in a predefined range for the image acquired through the camera 2 in such a way that the width in a predefined direction is greater than the width of an image portion of a lane mark in the same predefined direction. Details on the setting of a smoothing kernel will be described hereinafter.

The smoothing unit 13 smoothes the luminance image and the saturation image acquired through the camera 2, respectively, according to a filtering process by the usage of the smoothing kernel with the size thereof set by the kernel setting unit 12. In the smoothing by the smoothing unit 13 for each pixel in the image, the smoothing kernel is disposed with the pixel as the central pixel, and the smoothing process is performed to set the average of pixel value of all pixels contained in the range of smoothing kernel equal to the pixel value of the central pixel.

The variation degree calculating unit 14 calculates a variation degree of pixel value for each pixel in the luminance image acquired through the camera 2 with respect to the smoothed luminance image processed by the smoothing unit 13. Further, the variation degree calculating unit 14 calculates a variation degree of pixel value for each pixel in the saturation image acquired through the camera 2 with respect to the smoothed saturation image processed by the smoothing unit 13. Specifically, the variation degree calculating unit 14 uses a difference of pixel value for each pixel by subtracting the pixel value for each pixel in the smoothed luminance (saturation) image from the acquired luminance (saturation) image.

The pixel value replacing unit 15 replaces the pixel value of the pixel with the variation degree, which is calculated by the variation degree calculating unit 14 by the usage of the luminance image, equal to or smaller than a predefined value in the luminance image acquired through the camera 2 with a fixed value preliminarily defined. Furthermore, the pixel value replacing unit 15 replaces the pixel value of the pixel with the variation degree, which is calculated by the variation degree calculating unit 14 by the usage of the saturation image, equal to or smaller than a predefined value in the saturation image acquired through the camera 2 with the fixed value preliminarily defined as an example of the specific value (for example zero).

The lane mark detecting unit 16 detects a lane mark on a road where the vehicle 1 is travelling from the replaced luminance image and the replaced saturation image processed by the pixel value replacing unit 15. Specifically, the lane mark detecting unit 16 detects an area composed of pixels of pixel value not equal to the fixed value in the replaced luminance image and the replaced saturation image as an image portion of the lane mark on the road where the vehicle 1 is travelling. Herein, the lane mark detecting unit 16 extracts a line component through Hough transform as a lane mark candidate according to the data of dot sequence formed from the pixels of pixel value not equal to the fixed value in the replaced luminance image. Furthermore, the lane mark detecting unit 16 extracts a line component through Hough transform as a lane mark candidate according to the data of dot sequence formed by pixels of the pixel value not equal to the fixed value in the replaced saturation image. Thereafter, the lane mark detecting unit 16 detects a lane mark defining a traffic line on the road where the vehicle 1 is travelling from the extracted lane mark candidates according to the position thereof or the like on the image.

The vehicular image processing device 10 is an electronic unit composed of a computer (a micro-computer with a CPU, a memory, an arithmetic computation circuit such as an input/output circuit and the like, or a micro-computer integrated with such functions) and the like. The computer is provided with an A/D conversion circuit for transforming analogue input signals into digital signals, an image memory for storing the digital image signals, and an interface circuit for accessing (retrieving and writing) data stored in the image memory. The computer is configured to perform various arithmetic computations on an image stored in the image memory.

In the vehicular image processing device 10, the computer functions as the image acquiring unit 11, the kernel setting unit 12, the smoothing unit 13, the variation degree calculating unit 14, the pixel value replacing unit 15, and the lane mark detecting unit 16 as mentioned in the above.

Hereinafter, the operation (vehicular image process) of the vehicular image processing device 10 will be described with reference to the flow chart illustrated in FIG. 3. The process according to the flow chart in FIG. 3 is executed repeatedly for each control cycle of the vehicular image processing device 10.

Figure 3:
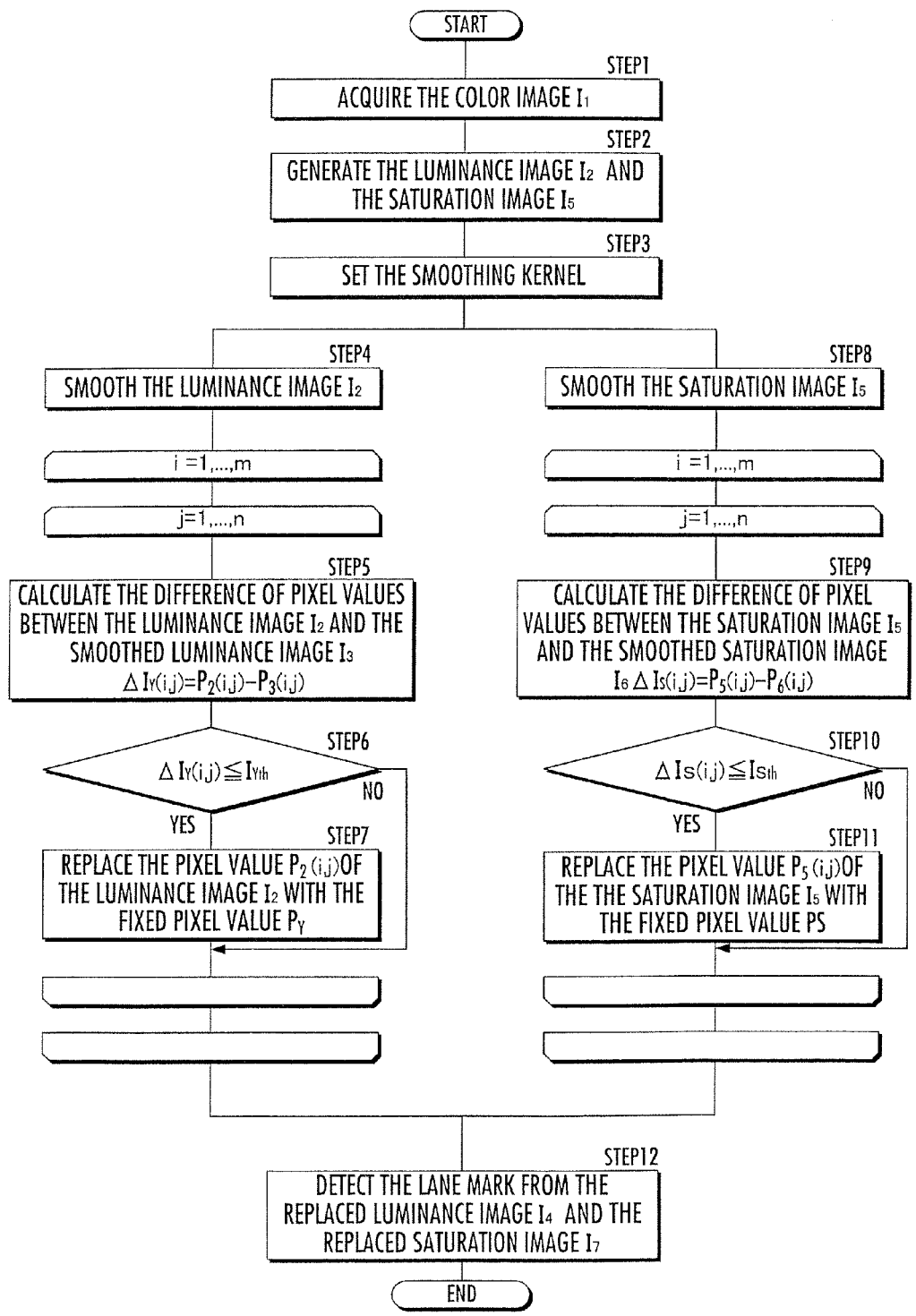
FIG. 3 is a flow chart illustrating an image process performed by the vehicular image processing device according to a first embodiment of the present invention.

At STEP 1 of FIG. 3, the image acquiring unit 11 acquires a color image through the camera 2. The acquired color image is stored in the image memory after A/D conversion.

Figure 4:
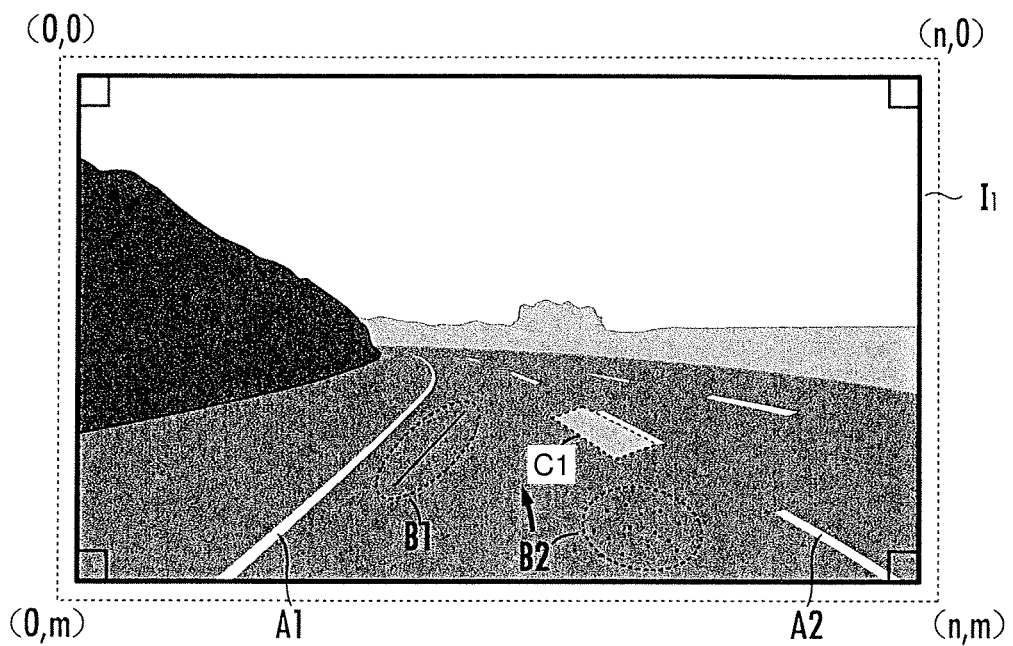
FIG. 4 is an exemplary diagram processed by the image process illustrated in FIG. 3.

A color image $I_1$ acquired through the camera 2 at a time in a control cycle is illustrated in FIG. 4 as an example. As illustrated in FIG. 4, the color image $I_1$ is composed of m×n pixels. If a single arbitrary pixel in the color image $I_1$ is set as $P_1$, the pixel $P_1$ has R, G, B values as color components and is denoted by $P_1(i, j)=(R_{ij}, G_{ij}, B_{ij})$. Here, i and j represents coordinates of an arbitrary pixel and are integral numbers in the range of $0 \leq i < m$ and $0 \leq j < n$.

In the example of FIG. 4, the vehicle 1 is travelling in the direction illustrated by an arrow, a solid yellow line A1 denotes a lane mark defining the left traffic line of the road where the vehicle 1 is travelling and a dashed white line A2 denotes a lane mark defining the right traffic line thereof. On the road surface defined by the traffic lines of the road where the vehicle 1 is travelling, there exist a repaired position (black line) B1 of a linear shape darker than the ambient color and a group of black dots B2 caused by local unevenness or stain. Further, a wide partial area C1 with the pixel value different from the ambient is present on the road surface area.

At STEP 2 of FIG. 3, the image acquiring unit 11 acquires the luminance image $I_2$ by calculating the luminance and the saturation image $I_5$ by calculating the saturation, respectively, according to the color components (R, G, B) of the pixel in the color image $I_1$ acquired at STEP 1.

Specifically, the image acquiring unit 11 calculates the luminance $Y_{ij}$ by using the color components $(R_{ij}, G_{ij}, B_{ij})$ of each pixel $P_1(i, j)$ in the color image $I_1$ according to the expression of $Y_{ij}=\alpha \times R_{ij}+\beta \times G_{ij}+\gamma \times B_{ij}$. Here, $\alpha$, $\beta$ and $\gamma$ are predefined coefficients satisfying $\alpha+\beta+\gamma=1$.

Figure 5A:
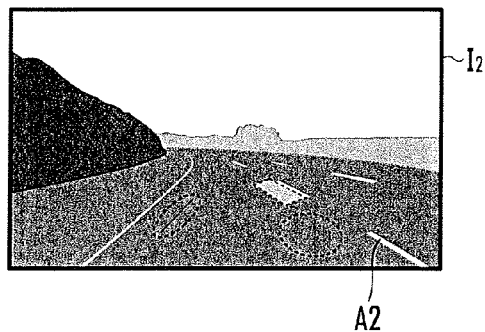
FIGS. 5A-5F are other exemplary diagrams processed by the image process illustrated in FIG. 3.

According thereto, as illustrated in FIG. 5A, the luminance image $I_2$ composed of m×n pixels is obtained with the luminance $Y_{ij}$ as the data of each pixel $P_2(i, j)$. In the luminance image $I_2$, the image portion of the white line A2 has greater luminance than that of the image portion of the yellow line A1. In the image portion of the road surface, the even road surface has further smaller luminance, and the partial area C1 has luminance a little bit greater than the even road surface. The repaired position B1 and the group of black dots B2 have luminance smaller than the even road surface.

It is acceptable that the image acquiring unit 11 calculates the luminance $Y_{ij}$ by using the maximum value $MAX_{ij}$ and the minimum value $MIN_{ij}$ among $(R_{ij}, G_{ij}, B_{ij})$ according to $Y_{ij}=(MAX_{ij}+MIN_{ij})/2$. It is also acceptable for the image acquiring unit 11 to use $G_{ij}$ value as the luminance $Y_{ij}$.

Meanwhile, the image acquiring unit 11 calculates the saturation $S_{ij}$ by using the R, G, B values $(R_{ij}, G_{ij}, B_{ij})$ of each pixel $P_1(i, j)$ in the color image $I_1$ according to $S_{ij}=(MAX_{ij}-MIN_{ij})/MAX_{ij}$.

Figure 5D:
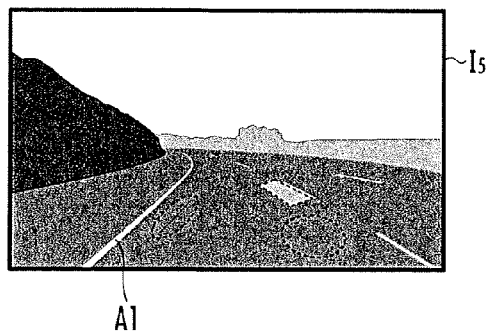

According thereto, as illustrated in FIG. 5D, the saturation image $I_5$ composed of m×n pixels is obtained with the saturation Sij as the data of each pixel $P_5(i, j)$. In the saturation image $I_5$, the image portion of the yellow line A1 has greater saturation than that of the image portion of the white line A2. In the image portion of the road surface, the even road surface has further smaller saturation, and the partial area C1 has saturation a little bit greater than the even road surface. The repaired position B1 and the group of black dots B2 have saturation smaller than the even road surface.

Subsequently, at STEP 3, the kernel setting unit 12 sets smoothing kernels of plural sizes for the luminance image $I_2$ and the saturation $I_5$ acquired at STEP 2.

The setting of smoothing kernel will be described with reference to FIG. 6.

Figure 6:
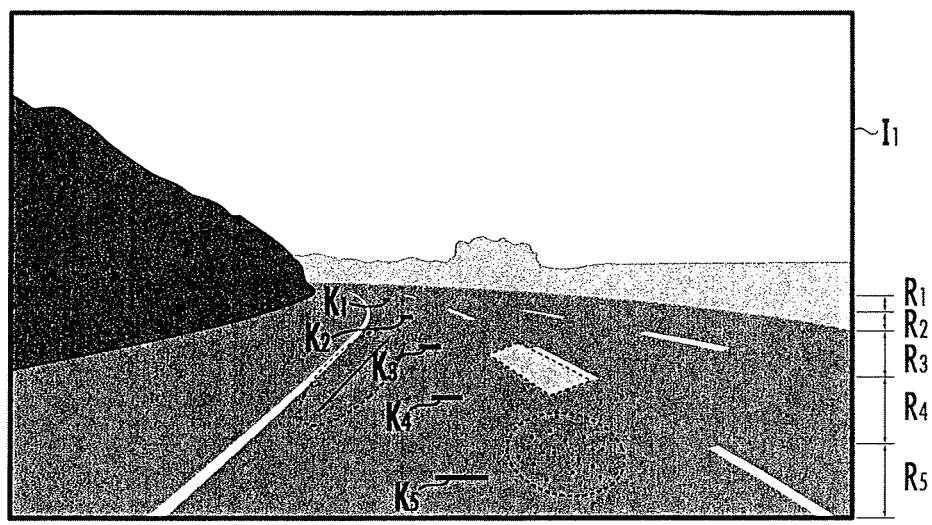
FIG. 6 is an explanatory diagram related to the setting of the smoothing kernel used in the image process illustrated in FIG. 3.

In FIG. 6, five smoothing kernels of $K_1$ to $K_5$ set for the luminance image $I_2$ are illustrated as examples. The smoothing kernels of $K_1$ to $K_5$ are used respectively when smoothing the luminance image $I_2$ with a pixel contained in areas of $R_1$ to $R_5$ respectively to be used as the central pixel. Similar to the luminance image $I_2$, the smoothing kernels $K_1$ to $K_5$ are set for the saturation image $I_5$.

The size $Y_f$(pixel) of the smoothing kernels $K_1$ to $K_5$ in the vertical direction is set at several pixels (for example, 1 to 3 pixels). The width between the areas of $R_1$ to $R_5$ in the vertical direction becomes narrower stepwise as they are located farther away from the vehicle 1. It is also acceptable that the size $Y_f$ becomes smaller as the distance to the vehicle 1 becomes farther.

The size $X_f$(pixel) of the smoothing kernels $K_1$ to $K_5$ in the horizontal direction is equal to a predefined width $\Delta X$ in the real space. The predefined width $\Delta X$ is set greater (for example, several times of the width of a lane mark, specifically 0.5 to 1 m) than a supposed width of a lane mark (for example, 0.1 to 0.75 m). It is also acceptable that the predefined width $\Delta X$ is set smaller than the supposed width of a road. The size $X_f$ of the smoothing kernels $K_1$ to $K_5$ in the horizontal direction is set at, for example, 10, 20, 50, 100, and 150 pixels, respectively.

Figure 7A:
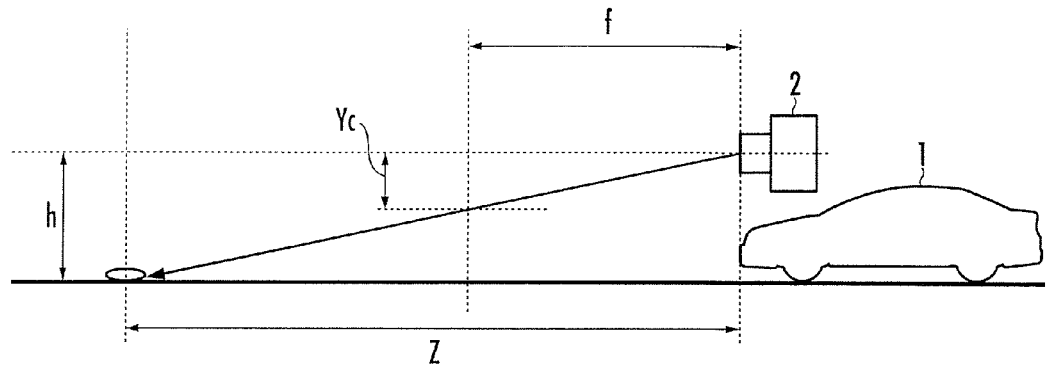
FIGS. 7A-7C are explanatory diagrams related to the size of the smoothing kernel illustrated in FIG. 6.
Figure 7B:
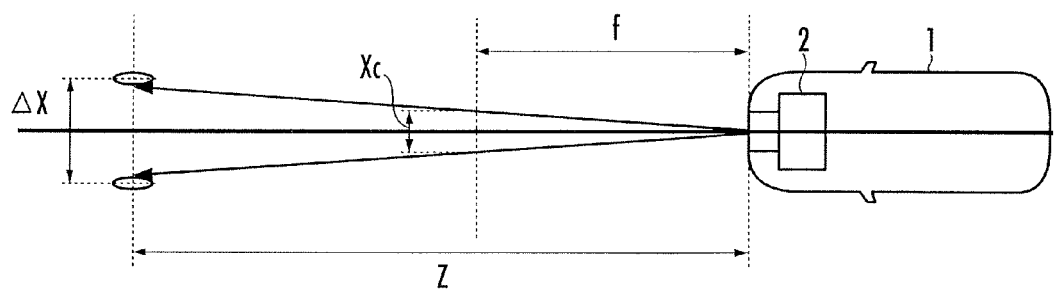
Figure 7C:
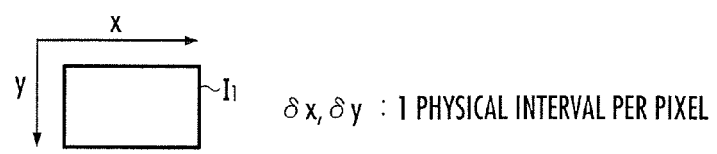

The size $X_f$ is set according to a relation between the real spatial coordinate system and the image coordinate system of the vehicle 1 as illustrated in FIG. 7A-7C. The coordinates (x, y) in the image coordinate system are set with the origin located at a left-upper position as illustrated in FIG. 7C. Physical interval per pixel is set as ($\delta x$, $\delta y$).

Under this situation, as illustrated in FIG. 7A, the distance Z from a subject on the road surface to the vehicle 1, the focal length f of the camera 2, the height h from the road surface to the camera 2 in the real space, and the physical height Yc of the photographed subject in the image satisfy a relationship denoted by the following expression (1).

$$Yc = f \times h / Z \quad (1)$$

The physical height Yc of the photographed subject in the image, the image coordinate y, and physical interval per pixel δy satisfy a relationship denoted by the following expression (2).

$$Yc = y \times \delta y \quad (2)$$

As illustrated in FIG. 7B, the distance Z from a subject on the road surface to the vehicle 1, the focal length f of the camera 2, the width ΔX of the subject in the real space, and the physical width Xc of the photographed subject in the image satisfy a relationship denoted by the following expression (3).

$$Xc = f \times \Delta X / Z \quad (3)$$

The physical width Xc of the photographed subject in the image, the image coordinate x, and physical interval per pixel δx satisfy a relationship denoted by the following expression (4).

$$Xc = x \times \delta x \quad (4)$$

According to the expressions of (1) to (4), the size $X_f$ is denoted by the following expression (5).

$$X_f = (\Delta X / h) \times y \quad (5)$$

Since the width ΔX of the subject in the real space and the height h from the road surface to the camera 2 in the real space are of a fixed value, the size $X_f$ will become smaller as the image coordinate y becomes smaller.

Further, according to the expressions (1) and (2), the image coordinate y will become smaller as the distance Z becomes greater; therefore, the size $X_f$ will become smaller. In other words, the size Xf is set to become smaller as the distance to the vehicle 1 becomes greater.

Referring back to FIG. 3, the smoothing unit 13 smoothes the luminance image $I_2$ illustrated in FIG. 5A at STEP 4 by using the smoothing kernels of $K_1$ to $K_5$ set at STEP 3 described above.

Figure 5B:
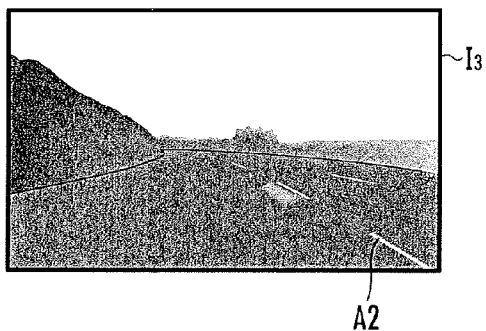

The luminance image $I_3$ after smoothed is illustrated in FIG. 5(b). Thereby, the variation width of the pixel value in the luminance image $I_2$ before smoothing becomes smaller and a low contrast image is obtained. In the smoothed luminance image $I_3$, the pixel value of the image portion of the repaired position B1 and the group of black dots B2 becomes approximate to that of the average luminance of the road surface, which makes it unable to be detected from the image portion in the ambient. Moreover, in the smoothed luminance image $I_3$, the pixel value of the image portion of the yellow line $A_1$ and the white line A2 becomes approximate to that of the average luminance of the road surface. However, for the image portion of the road surface and the partial area C1, since the size of the image portion of the road surface and the partial area C1 is greater than the kernel size, the smoothing has little effect thereon, thus, in the smoothed luminance image $I_3$, the pixel value of the road surface and the partial area C1 in the luminance image $I_2$ before smoothing is maintained.

Thereafter, the process from STEP 5 to STEP 7 in FIG. 3 is performed on all pixels in the luminance image $I_2$ (i=1~m, j=1~n).

Firstly, at STEP 5, the variation degree calculating unit 14 calculates the variation degree $\Delta I_Y$ of the pixel value of the pixel (i, j) by subtracting the pixel value $P_3(i, j)$ of the luminance image $I_3$ after smoothed at STEP 4 from the pixel value $P_2(i, j)$ of the luminance image $I_2$ acquired at STEP 2: $\Delta I_Y(i, j) = P_2(i, j) - P_3(i, j)$.

Thereafter, at STEP 6, the pixel value replacing unit 15 determines whether or not the variation degree $\Delta I_Y(i, j)$ of the pixel value is equal to or smaller than a predefined value $I_{Yth}$. The predefined value $I_{Yth}$ is a value (for example, equal to or smaller than zero) defined according to a possible range of the variation degree of the luminance of the image portion of the lane mark (white line).

If the determination result at STEP 6 is "YES", the pixel (i, j) is supposed to be the image portion with a small variation degree $\Delta I_Y(i, j)$ of the pixel value, in other words, the image portion of the yellow line A1 having the luminance smaller than the white line A2 and approximate to the average luminance of the road surface, the image portion of a road surface (including the partial area C1) with a small variation of luminance before and after the smoothing, or the image portion of the repaired position B1 and the group of black dots B2 with the luminance smaller than the road surface. Then, the process moves to STEP 7, the pixel value replacing unit 15 replaces the pixel value $P_2(i, j)$ of the luminance image $I_2$ with a fixed value and moves to the next process.

If the determination result at STEP 6 is "NO", the pixel (i, j) is supposed to be the image portion of the white line A2 with a greater luminance. Thus, the pixel value replacing unit 15 performs the next process without replacing the pixel value of the pixel (i, j).

Figure 5E:
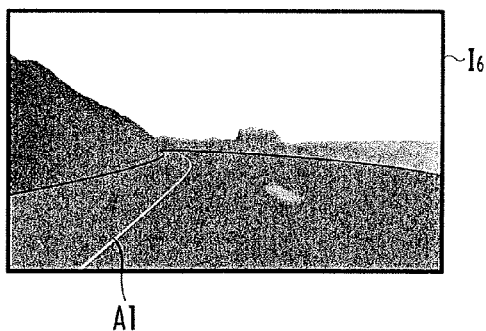
Figure 5C:
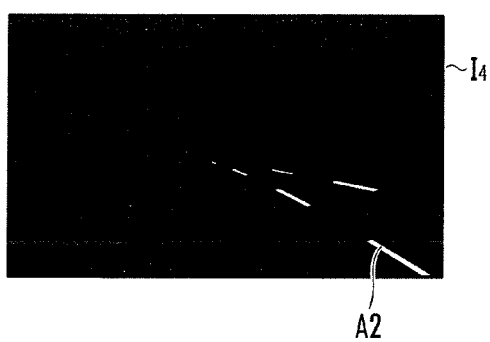

A replaced luminance image $I_4$ obtained after the process from STEP 5 to STEP 7 has been performed on all the pixels in the luminance image $I_2$ is illustrated in FIG. 5C. As illustrated in FIG. 5C, in the replaced luminance image $I_4$, the image portion of each of the yellow line A1, the repaired position B1, the group of black dots B2 and the road surface (including the partial area C1) is replaced by the fixed value, only the image portion of the white line A2 is maintained at the pixel value of the luminance image $I_2$. Therefore, only the image portion of the white line A2 is remained maintained in the replaced luminance image $I_4$.

Thereafter, in parallel with the process from STEP 4 to STEP 7 or after the mentioned process, the smoothing unit 13 smoothes the saturation image $I_5$ illustrated in FIG. 5D at STEP 8 by using the smoothing kernels of $K_1$ to $K_5$ set at STEP 3 described above.

A smoothed saturation image $I_6$ is illustrated in FIG. 5E. Thereby, the variation width of the pixel value in the saturation image $I_5$ before smoothing becomes narrower and a low contrast image is obtained. In the smoothed saturation image $I_6$, the pixel value of the image portion of the repaired position B1 and the group of black dots B2 becomes approximate to that of the average saturation of the road surface, which makes it unable to be detected from the image portion in the ambient. Moreover, in the smoothed saturation image $I_6$, the pixel value of the image portion of the yellow line $A_1$ and the white line A2 becomes approximate to that of the average saturation of the road surface. However, for the image portion of the road surface and the partial area C1, since the size of the image portion of the road surface and the partial area C1 is greater than the kernel size, the smoothing has little effect thereon, thus, in the smoothed saturation image $I_6$, the pixel value of the road surface and the partial area C1 in the saturation image $I_5$ before smoothing is maintained.

Thereafter, the process from STEP 9 to STEP 11 in FIG. 3 is performed on all pixels in the saturation image $I_5$ (i=1~m, j=1~n).

Firstly, at STEP 9, the variation degree calculating unit 14 calculates the variation degree $\Delta I_S$ of the pixel value of the pixel (i, j) by subtracting the pixel value $P_6(i, j)$ of the saturation image $I_6$ after smoothed at STEP 8 from the pixel value $P_5(i, j)$ of the saturation image $I_5$ acquired at STEP 2: $\Delta I_S(i, j)=P_5(i, j)-P_6(i, j)$.

Thereafter, at STEP 10, the pixel value replacing unit 15 determines whether or not the variation degree $\Delta I_S(i, j)$ of the pixel value is equal to or smaller than a predefined value $I_{Sth}$. The predefined value $I_{Sth}$ is a value (for example, equal to or smaller than zero) defined according to a possible range of the variation degree of the saturation of the image portion of the lane mark (yellow line).

If the determination result at STEP 10 is "YES", the pixel (i, j) is supposed to be the image portion with a small variation degree $\Delta I_S(i, j)$ of the pixel value, in other words, the image portion of the white line A2 having the saturation smaller than the yellow line A1 and approximate to the average saturation of the road surface, the image portion of a road surface (including the partial area C1) with a small variation of saturation before and after the smoothing, or the image portion of the repaired position B1 and the group of black dots B2 with saturation smaller than the road surface. Then, the process moves to STEP 11, the pixel value replacing unit 15 replaces the pixel value $P_5(i, j)$ of the saturation image $I_5$ with a fixed value and moves to the next process.

If the determination result at STEP 10 is "NO", the pixel (i, j) is supposed to be the image portion of the yellow line A1 with a greater saturation. Thus, the pixel value replacing unit 15 performs the next process without replacing the pixel value of the pixel (i, j).

Figure 5F:
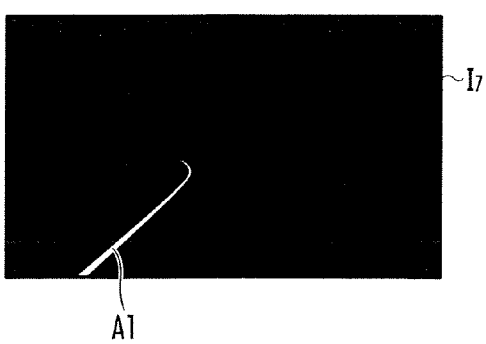

A replaced saturation image $I_7$ obtained after the process from STEP 9 to STEP 11 has been performed on all the pixels in the saturation image $I_5$ is illustrated in FIG. 5F. As illustrated in FIG. 5F, in the replaced saturation image $I_7$, the image portion of each of the white line A2, the repaired position B1, the group of black dots B2 and the road surface (including the partial area C1) is replace by the fixed value, only the image portion of the yellow line A1 is maintained at the pixel value of the saturation image $I_5$. Therefore, only the image portion of the yellow line A1 is maintained in the replaced saturation image $I_7$.

Thereafter, the process moves to STEP 12 where the lane mark detecting unit 16 detects the lane mark from the replaced luminance image $I_4$ obtained at STEP 7 and the replace saturation image $I_7$ obtained at STEP 11. In the replaced luminance image $I_4$ and the replaced saturation image $I_7$, only the image portions of the yellow line A1 and the white line A2 are maintained, the lane mark detecting unit 16 can easily detect the lane mark on the road where the vehicle 1 is travelling without the need of further performing the edge extracting process or the like.

Since only the image portion of the white line A2 is maintained, in the replaced luminance image $I_4$, and the lane mark detecting unit 16 detects the lane mark by using the replaced luminance image $I_4$, the white line A2 can be detected precisely. Moreover, since only the image portion of the yellow line A1 is maintained in the replaced saturation image $I_7$, and the lane mark detecting unit 16 detects the lane mark by using the replaced saturation image $I_7$, the yellow line A1 can be detected precisely.

Hereby, the vehicular image process performed by the vehicular image processing device 10 of the first embodiment has been described. According to the present embodiment, after the photographed image for the ambient of the vehicle 1 has been processed to reduce the effects by the variation on the luminance or color in the image, the lane marks A1 and A2 on the road where the vehicle 1 is travelling can be detected precisely from the processed image.

In the present embodiment, the variation degree calculating unit 14 calculates the difference between the pixel values as the variation degree; however, it is also acceptable to use a ratio of the pixel value of each pixel obtained by dividing the acquired image by the smoothed image ($\Delta I_Y(i, j)=P_2(i, j)/P_3(i, j)$, $\Delta I_S(i, j)=P_5(i, j)/P_6(i, j)$) as the variation degree. In this situation, the predefined values $I_{Yth}$ and $I_{Sth}$ are values (for example, equal to or smaller than one) defined according to a possible range of the variation degree of the pixel values of the image portion of the lane mark.

Figure 8:
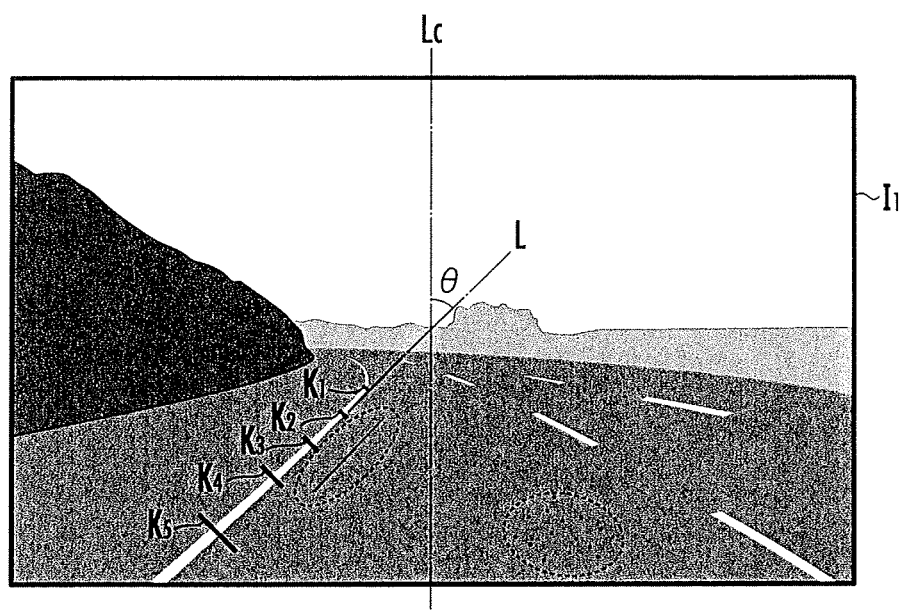
FIG. 8 is an explanatory diagram related to the direction of the smoothing kernel illustrated in FIG. 6.

In the present embodiment, as illustrated in FIG. 8, it is acceptable to set the kernel direction in such a way that an inclination of the central line L of the long side of the kernel with respect to the direction Lc in the image corresponded to the travelling direction of the vehicle 1 is of a predefined angle θ (for example 45°).

In the present embodiment, the smoothing kernel is set to a rectangular shape; however, as another embodiment, it is acceptable to set the smoothing kernel to a trapezoidal shape.

In the present embodiment, the image acquiring unit 11 is configured to acquire the color image with the pixel data formed from color components of R, G and B values; however, as another embodiment, it is acceptable for it to acquire the color image with the pixel data formed from color components of CMY outputs or the like.

In the present embodiment, the smoothing process and the pixel value replacing process are performed respectively on the luminance image and the saturation image, and the lane mark is detected according to the replaced luminance image and the replaced saturation image; however, it is acceptable to perform the smoothing process and the pixel value replacing process on either of the luminance image and the saturation image and detect the lane mark according to the replaced images.

In the present embodiment, the color image is acquired through the camera 2; as another embodiment, it is acceptable to acquire a gray scale image (luminance image) with pixel data formed from luminance. In this situation, the smoothing process and the pixel value replacing process are performed on the acquired luminance image, and the lane mark is detected according to the replaced luminance image.

In the present embodiment, the camera 2 is configured to photograph the front side of the vehicle 1 and the lane mark is detected according to the image of the road in the front side of the vehicle 1; however, as another embodiment, it is acceptable to photograph the rear side of the vehicle 1 and detect the lane mark according to the image of the rear side of the vehicle 1.

Second Embodiment

The second embodiment has basically the same configuration and functions as the vehicular image processing device 10 illustrated in FIG. 1 and FIG. 2 in the first embodiment. The difference is only related to the image processing contents illustrated in FIG. 9, which will be described with reference to FIG. 9 through FIG. 12.

At STEP 1 of FIG. 9, the image acquiring unit 11 acquires a gray scale image (luminance image) through the camera 2. The acquired luminance image is stored in the image memory after A/D conversion.

Figure 10A:
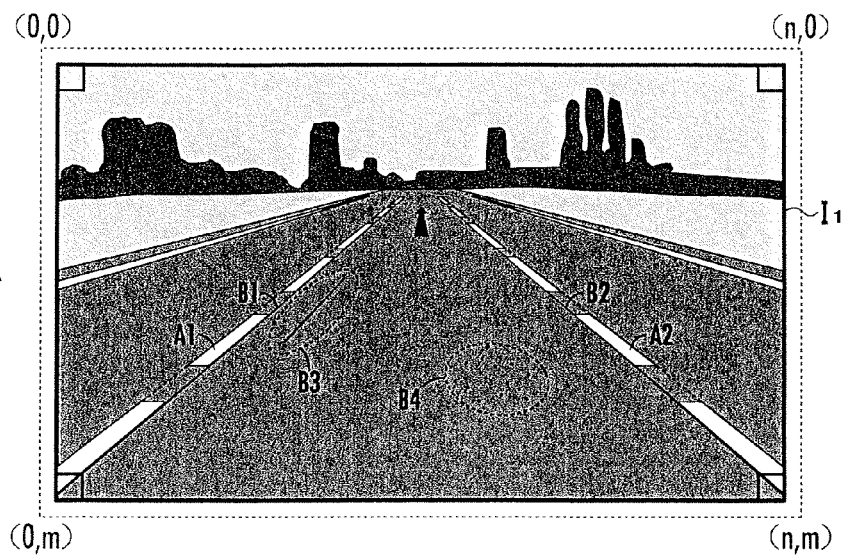
FIGS. 10A-10C are exemplary diagrams processed by the image process illustrated in FIG. 9.

A luminance image $I_1$ acquired through the camera 2 at a time in a control cycle is illustrated in FIG. 10A as an example. As illustrated in FIG. 10A, the luminance image $I_1$ is composed of m×n pixels. Each pixel $P_1$ in the luminance image $I_1$ has a luminance value Y denoted by $P_1(i, j)=Y_{ij}$.

Here, i and j are integral numbers in the range of $0 \leq i < m$ and $0 \leq j < n$, denoting coordinates of each pixel.

In the example of FIG. 10A, the vehicle 1 is travelling in the direction illustrated by an arrow, a dashed white line A1 denotes a lane mark defining the left traffic line of the road where the vehicle 1 is travelling and a dashed white line A2 denotes a lane mark defining the right traffic line thereof. As illustrated, there are concaves and convexes present on the edge portions of the dashed white lines A1 and A2, forming linear shadows (black line) B1 and B2 thereon. Further, on the road surface defined by the traffic lines of the road where the vehicle 1 is travelling, there are a repaired position (black line) B3 of a linear shape darker than the ambient color and a group of black dots B4 caused by local unevenness or stain.

Subsequently, at STEP 2 of FIG. 9, the kernel setting unit 12 sets smoothing kernels of plural sizes for the luminance image $I_1$ acquired at STEP 1.

The setting of smoothing kernel will be described with reference to FIG. 11.

Figure 11:
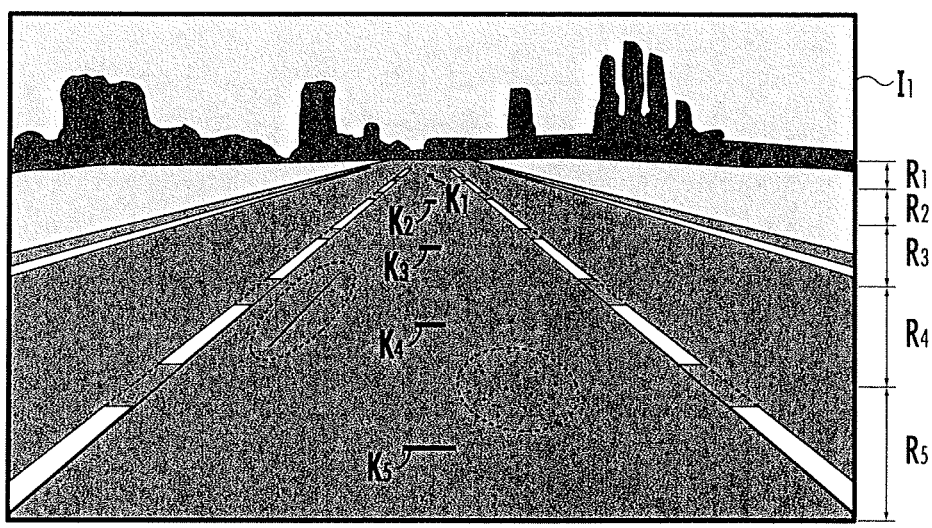
FIG. 11 is an explanatory diagram related to the setting of a smoothing kernel for the image process illustrated in FIG. 9.

In FIG. 11, five smoothing kernels of $K_1$ to $K_5$ set for the luminance image $I_1$ are illustrated as examples. The smoothing kernels of $K_1$ to $K_5$ are used respectively when smoothing the luminance image $I_1$ with a pixel contained respectively in areas of $R_1$ to $R_5$ as the central pixel.

The size $Y_f$(pixel) of the smoothing kernels $K_1$ to $K_5$ in the vertical direction is set at several pixels (for example, 1 to 3 pixels). The width between the areas of $R_1$ to $R_5$ in the vertical direction becomes narrower stepwise as they are located farther away from the vehicle 1. It is also acceptable that the size $Y_f$ becomes smaller as the distance to the vehicle 1 becomes farther.

The size $X_f$(pixel) of the smoothing kernels $K_1$ to $K_5$ in the horizontal direction is equal to a predefined width $\Delta X$ in the real space. The predefined width $\Delta X$ is set greater (for example, several times of the width of a lane mark, specifically 0.5 to 1 m) than a supposed width of a lane mark (for example, 0.1 to 0.75 m). It is also acceptable that the predefined width $\Delta X$ is set smaller than the supposed width of a road. The size $X_f$ of the smoothing kernels $K_1$ to $K_5$ in the horizontal direction is set at, for example, 10, 20, 50, 100, and 150 pixels, respectively.

The size $X_f$ is set according to a relation between the real spatial coordinate system and the image coordinate system of the vehicle 1 as illustrated in FIGS. 7A-7C. The coordinates (x, y) in the image coordinate system are set with the origin located at a left-upper position as illustrated in FIG. 7C. Physical interval per pixel is set as ($\delta x$, $\delta y$). The expressions of (1) to (5) based on the coordinate systems illustrated in FIGS. 7A and 7B are mentioned in the above; therefore, the descriptions thereof will be omitted.

Referring back to FIG. 9, the smoothing unit 13 smoothes the luminance image $I_1$ illustrated in FIG. 10A at STEP 3 by using the smoothing kernels of $K_1$ to $K_5$ set at STEP 2.

Figure 10B:
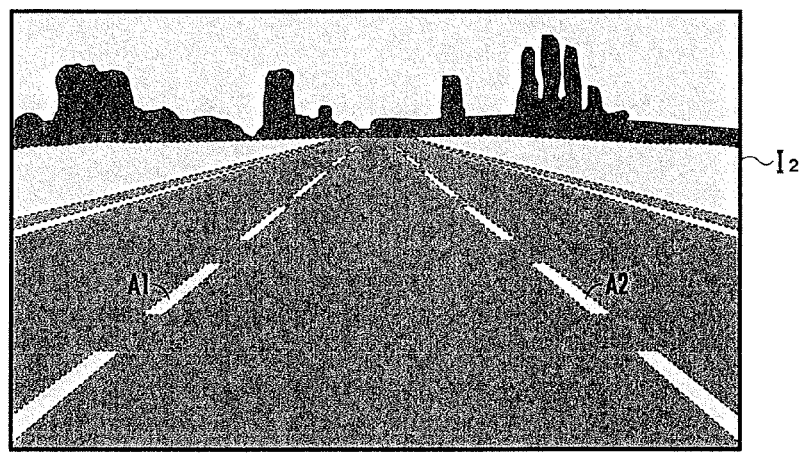

The luminance image $I_2$ after smoothed is illustrated in FIG. 10B. Thereby, the variation width of the pixel value in the luminance image $I_1$ before smoothing becomes narrower and a low contrast image is obtained. In the smoothed luminance image $I_2$, the pixel value of the image portion of the shadows B1 and B2, the repaired position B3, and the group of black dots B4 becomes approximate to that of the average luminance of the road surface, which makes it unable to be detected from the image portion in the ambient. Moreover, the pixel value of the image portion of the white lines A1 and A2 becomes approximate to that of the average luminance of the road surface.

Thereafter, the process from STEP 4 to STEP 6 in FIG. 9 is performed on all pixels in the image (i=1~m, j=1~n).

Firstly, at STEP 4, the variation degree calculating unit 14 calculates the variation degree $\Delta I_Y$ of the pixel value of the pixel (i, j) by subtracting the pixel value $P_2(i, j)$ of the luminance image $I_2$ after smoothed at STEP 3 from the pixel value $P_1(i, j)$ of the luminance image $I_1$ acquired at STEP 1: $\Delta I_Y(i, j) = P_1(i, j) - P_2(i, j)$.

Thereafter, at STEP 5, the pixel value replacing unit 15 determines whether or not the variation degree $\Delta I_Y(i, j)$ of the pixel value is equal to or smaller than a predefined value $I_{Yth}$. The predefined value $I_{Yth}$ is a value (for example, equal to or smaller than zero) defined according to a possible range of the variation degree of the pixel value of the image portion of the lane mark.

If the determination result at STEP 5 is "YES", the pixel (i, j) is supposed to be the image portion of the road surface, or the image portion of the shadows B1 and B2 darker than the road surface, the repaired position B3 and the group of black dots B4. Then, the process moves to STEP 6, the pixel value replacing unit 15 replaces the pixel value $P_1(i, j)$ of the acquired image with the pixel value $P_2(i, j)$ of the smoothed image serving as an example of the specific value and moves to the next process.

If the determination result at STEP 5 is "NO", the pixel (i, j) is supposed to be the image portion of the brighter white lines A1 and A2. Thus, the pixel value replacing unit 15 performs the next process without replacing the pixel value of the pixel (i, j).

Figure 10C:
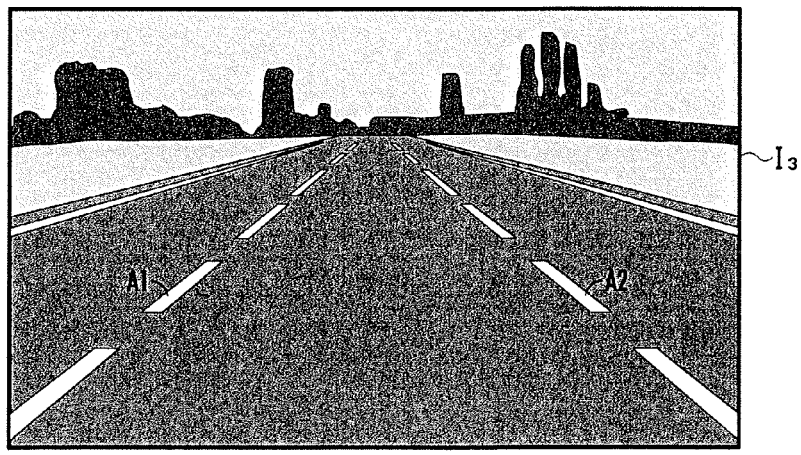

A replaced image $I_3$ obtained after the process from STEP 4 to STEP 6 has been performed on all the pixels in the image is illustrated in FIG. 10C. As illustrated in FIG. 10C, in the replaced image $I_3$, the image portion of the shadows B1 and B2, the repaired position B3, and the group of black dots B4 is replaced with the pixel value of the smoothed image $I_2$, and on the opposite, the image portion of the white lines A1 and A2 is maintained at the pixel value of the luminance image $I_1$. Thereby, in the replaced image $I_3$, the image portion of the shadows B1 and B2, the repaired position B3, and the group of black dots B4 is removed with the image portion of the white lines A1 and A2 remained.

Thereafter, the process moves to STEP 7 where the lane mark detecting unit 16 detects the lane mark from the replaced image $I_3$. In the replaced image $I_3$, the image portion of the shadows B1 and B2, the repaired position B3, and the group of black dots B4 has been removed, and only the edge points corresponding to the image portion of the white lines A1 and A2 are extracted according to the edge extraction process; therefore, the white lines A1 and A2 can be detected precisely on the basis of the edge points.

Hereby, the vehicular image process performed by the vehicular image processing device 10 of the second embodiment has been described. According to the present embodiment, after the photographed image for the ambient of the vehicle 1 has been processed to reduce the effects by the variation on the luminance or color in the image, the white lines A1 and A2 on the road where the vehicle 1 is travelling can be detected precisely from the processed image.

In the present embodiment, the variation degree calculating unit 14 calculates the difference between the pixel values as the variation degree; however, it is also acceptable to use a ratio of the pixel value of each pixel obtained by dividing the acquired image by the smoothed image ($\Delta I_Y(i, j) = P_1(i, j)/P_2(i, j)$). In this situation, the predefined value $I_{Yth}$ is a value (for example, equal to or smaller than one) defined according to a possible range of the variation degree of the pixel values of the image portion of the lane mark.

Figure 12:
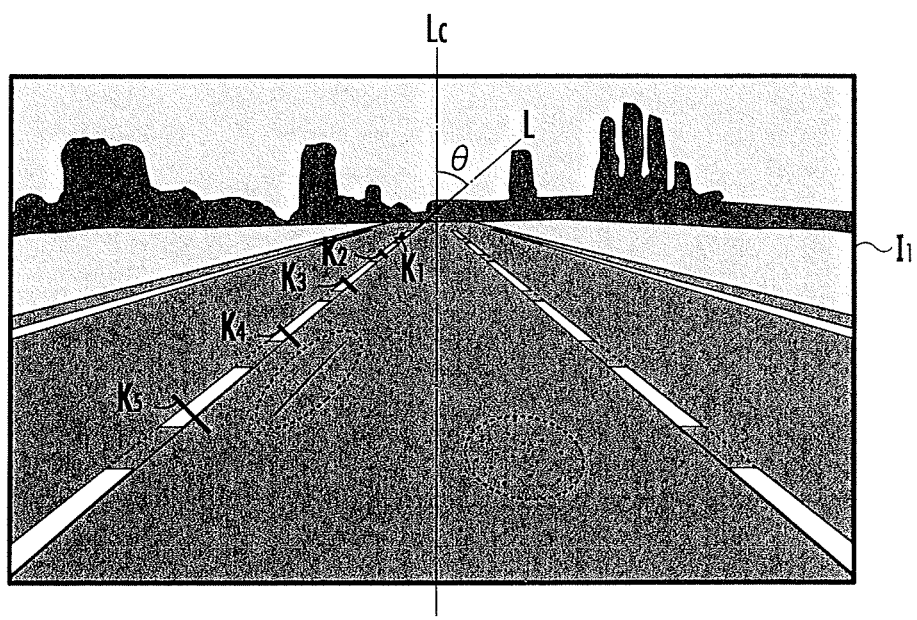
FIG. 12 is an explanatory diagram related to the direction setting of for the smoothing kernel illustrated in FIG. 11.

In the present embodiment, as illustrated in FIG. 12, it is acceptable to set the kernel direction in such a way that an inclination of the central line L of the long side of the kernel with respect to the direction Lc in the image corresponded to the travelling direction of the vehicle 1 is of a predefined angle θ (for example 45°).

In the present embodiment, the smoothing kernel is set to a rectangular shape; however, as another embodiment, it is acceptable to set the smoothing kernel to a trapezoidal shape.

In the present embodiment, the image acquiring unit 11 is configured to acquire the gray scale image through the camera 2; however, as another embodiment, it is acceptable for it to acquire the color image with the pixel data formed from color components of R, G and B values (or CMY output or the like). In this case, the image acquiring unit 11 calculates the luminance Y of the pixels in the acquired color image according to the color components of R, G and B values in the acquired color image and the expression of $Y=\alpha \times R+\beta \times G+\gamma \times B$ to generate the luminance image. Herein, $\alpha$, $\beta$ and $\gamma$ are predefined coefficients satisfying $\alpha+\beta+\gamma=1$.

It is acceptable that the image acquiring unit 11 calculates the luminance Y according to the maximum value MAX and the minimum value MIN and the expression of $Y=(MAX+MIN)/2$. It is also acceptable for the image acquiring unit 11 to use G value as the luminance Y.

In the present embodiment, the image acquiring unit 11 is configured to acquire the luminance image through the camera 2, the smoothing unit 13 is configured to smooth the luminance image and the pixel value replacing unit 14 is configured to replace the pixel value of the luminance image with the pixel value of the smoothed image; however, as another embodiment, for example, the image acquiring unit 11 may be configured to acquire the color image through the camera 2, to calculate the saturation of pixels according to the color components of the pixels in the color image, and to generate the saturation image with the saturation as the pixel value, and the subsequent smoothing process and the pixel value replacing process may be performed on the saturation image.

In the present embodiment, the camera 2 is configured to photograph the front side of the vehicle 1 and the vehicular image processing device 10 is configured to detect the lane mark according to the image of the road in the front side of the vehicle 1; however, as another embodiment, it is acceptable that the camera is configured to photograph the rear side of the vehicle 1 and the vehicular image processing device 10 is configured to detect the lane mark according to the image of the rear side of the vehicle 1.

What is claimed is:

1. A vehicular image processing device configured to process an image acquired from a photographing unit mounted in a vehicle and detect a lane mark on a road where the vehicle is travelling from the processed image, comprising:
    a kernel setting unit configured to set a kernel function for smoothing the image acquired from the photographing device so that the width of a smoothed image in a predefined direction is in a predefined range greater than the width of an image portion of the lane mark in the predefined direction;
    a smoothing unit configured to smooth the acquired image according to a filtering process by the usage of the kernel function set by the kernel setting unit for each pixel in the image, the smoothing kernel is disposed with the pixel as the central pixel, and the smoothing process is performed;
    a variation degree calculating unit configured to calculate, as a pixel value a variation degree, a difference between a pixel value of each pixel in the acquired image and a pixel value of each corresponding pixel in the smoothed image processed by the smoothing unit;
    a pixel value replacing unit configured to replace in the smoothed image, for each of the pixels in the acquired image whose pixel value variation degree is equal to or smaller than a predefined value, the corresponding pixel value with a specific value; and
    a lane mark detecting unit configured to detect the lane mark from the smoothed image which has been subjected to pixel value replacing by the pixel value replacing unit.

2. The vehicular image processing device according to claim 1, wherein the specific value is a fixed, preset value defined.

3. The vehicular image processing device according to claim 1, wherein the kernel setting unit sets the kernel function in such a way that a size for an image portion in the image corresponded to a predefined area on the road is set smaller as a distance from the vehicle to the predefined area on the road is becoming greater.

4. The vehicular image processing device according to claim 1, wherein the kernel setting unit sets the kernel function such that the smoothed image has a rectangular shape or a trapezoidal shape.

5. The vehicular image processing device according to claim 4, wherein the kernel setting unit sets the kernel function in such a way that the direction of inclination of the center line of the long side of the smoothed image with respect to the direction corresponded to the travelling direction of the vehicle in the smoothed image is equal to a predefined angle.

6. The vehicular image processing device according to claim 1, wherein the variation degree calculating unit calculates, as the pixel value variation degree, either the difference of pixel value of each pixel obtained by subtracting the pixel value of each pixel in the smoothed image from the pixel value of each pixel in the acquired image or a ratio of pixel value of each pixel obtained by dividing the pixel value of each pixel in the acquired image by the pixel value of each pixel in the smoothed image as the variation degree.

7. The vehicular image processing device according to claim 1, wherein luminance is used as the pixel value in the smoothed image processed by the smoothing unit.

8. The vehicular image processing device according to claim 1, wherein luminance or saturation calculated from color components of a color image is used as the pixel value in the smoothed image processed by the smoothing unit.

9. The vehicular image processing device according to claim 2, wherein the lane mark detecting unit detects an area composed of pixels whose pixel values have not been replaced by the pixel value replacing unit as an image portion corresponded to the lane mark on the road where the vehicle is travelling.

10. A vehicle which is provided with a photographing unit and has a function of processing an image acquired from the photographing unit and detecting a lane mark on a road where the vehicle is travelling, comprising:
    a kernel setting unit configured to set a kernel function for smoothing the image acquired from the photographing device so that the width of a smoothed image in a predefined direction is in a predefined range greater than the width of an image portion of the lane mark in the predefined direction;
    a smoothing unit configured to smooth the acquired image according to a filtering process by the usage of the kernel function set by the kernel setting unit for each pixel in the image, the smoothing kernel is disposed with the pixel as the central pixel, and the smoothing process is performed;

a variation degree calculating unit configured to calculate, as a pixel value a variation degree, a difference between a pixel value of each pixel in the acquired image and a pixel value of each corresponding pixel in the smoothed image processed by the smoothing unit;

a pixel value replacing unit configured to replace in the smoothed image, for each of the pixels in the acquired image whose pixel value variation degree is equal to or smaller than a predefined value, the corresponding pixel value with a specific value; and a lane mark detecting unit configured to detect the lane mark from the smoothed image which has been subjected to pixel value replacing by the pixel value replacing unit.

11. The vehicle according to claim 10, wherein the specific value is a fixed, preset value defined.

12. A vehicular image processing program embedded in a non-transitory medium configured to causing a computer to process an image acquired from a photographing unit mounted in a vehicle and detect a lane mark on a road where the vehicle is travelling from the processed image, and the computer being caused to execute:

a kernel setting function of setting a kernel for smoothing the image acquired from the photographing device so that the width of a smoothed image in a predefined direction is in a predefined range greater than the width of an image portion of the lane mark in the predefined direction;

a smoothing function of smoothing the acquired image according to a filtering process by the usage of the kernel set by the kernel setting function for each pixel in the image, the smoothing kernel is disposed with the pixel as the central pixel, and the smoothing function is performed;

a variation degree function of calculating, as a pixel value a variation degree, a difference between a pixel value of each pixel between the acquired image and a pixel value of each corresponding pixel in the image smoothed by the smoothing function;

a pixel value replacing function of replacing in the smoothed image, for each of the pixels in the acquired image whose pixel value variation degree is equal to or smaller than a predefined value, the corresponding pixel value with a specific value; and a lane mark detecting function of detecting the lane mark from the smoothed image which has been subjected to pixel value replacing by the pixel value replacing function.

13. The vehicular image processing program according to claim 12, wherein the specific value is a fixed, preset value defined.

14. The vehicular image processing device according to claim 2, wherein the kernel setting unit sets the kernel function in such a way that a size for an image portion in the image corresponded to a predefined area on the road is set smaller as a distance from the vehicle to the predefined area on the road is becoming greater.

15. The vehicular image processing device according to claim 2, wherein the kernel setting unit sets the kernel function such that the smoothed image has a rectangular shape or a trapezoidal shape.

16. The vehicular image processing device according to claim 2, wherein the variation degree calculating unit calculates, as the pixel value variation degree, either the difference of pixel value of each pixel obtained by subtracting the pixel value of each pixel in the smoothed image from the pixel value of each pixel in the acquired image or a ratio of pixel value of each pixel obtained by dividing the pixel value of each pixel in the acquired image by the pixel value of each pixel in the smoothed image as the variation degree.

17. The vehicular image processing device according to claim 2, wherein luminance is used as the pixel value in the smoothed image processed by the smoothing unit.

18. The vehicular image processing device according to claim 1, wherein the smoothing unit sets the average of all pixel values contained in the range of the smoothing kernel equal to the value of the central pixel.

* * * * *